5774X
T. BORDEN.
Cultivator.
Patented Jan. 13, 1830.
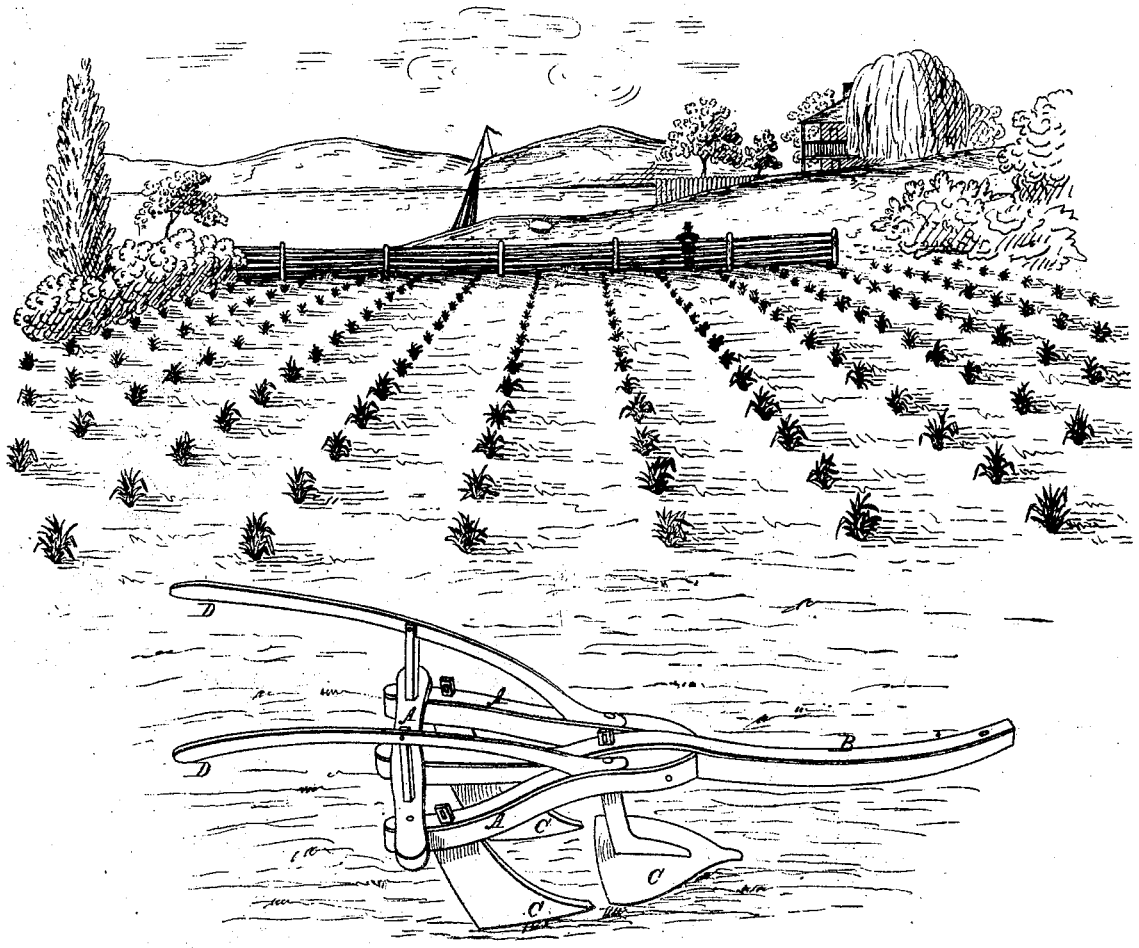
AM. PHOTO-LITHO. CO. N.Y. (OSBORNE'S PROCESS.)

5774X

UNITED STATES PATENT OFFICE.

THOMAS BORDEN, OF PORTSMOUTH, RHODE ISLAND.

IMPROVEMENT IN PLOWS.

Specification forming part of Letters Patent dated January 13, 1830.

*To all whom it may concern:*

Be it known that I, THOMAS BORDEN, of Portsmouth, in the county of Newport and State of Rhode Island, have invented a new and useful Improvement in Plows; and the following is a full and exact description of the construction and operation of said improvement as invented and improved by me, a model and drawing of which, with references, are herewith presented.

The object of the improvement is to save great part of the labor of hoeing corn, &c., by turning the earth between the rows each way toward the corn, &c.

The description of the improvement is as follows: The frame and beam of the plow are in a triangular form, with handles in the usual form. Into the frame is fitted three shares, composed of cast-iron, wrought-iron, or steel. The one in front, attached to the beam, is a double share, and on each side, attached to the frame, is a single share, as representad in the model and drawing. By passing the plow between the rows of corn &c., the earth will be turned each way toward the rows, which will greatly facilitate the operation and save great part of the labor of hoeing in the common way.

THOS. BORDEN.

Witnesses:
D. MELVILLE.
GEO. C. MASON.